United States Patent [19]

Peterson

[11] 4,333,084
[45] Jun. 1, 1982

[54] PROGRAM PACER

[75] Inventor: Donald A. Peterson, Berwyn, Ill.

[73] Assignee: Stoelting Company, Chicago, Ill.

[21] Appl. No.: 194,761

[22] Filed: Oct. 6, 1980

[51] Int. Cl.³ .............................................. G01D 9/00
[52] U.S. Cl. .................................... 346/17; 346/33 ME
[58] Field of Search ............... 346/17, 23, 33 ME, 37

[56] References Cited

U.S. PATENT DOCUMENTS

| | | | |
|---|---|---|---|
| 3,163,486 | 12/1964 | Tomes | 346/33 ME |
| 3,434,149 | 3/1969 | Brousseau et al. | 346/17 X |
| 3,673,607 | 6/1972 | Hoeffel et al. | 346/17 |
| 3,805,412 | 4/1974 | Lambright et al. | 346/33 ME X |

*Primary Examiner*—George H. Miller, Jr.
*Attorney, Agent, or Firm*—W. A. Snow

[57] ABSTRACT

A timed lighting display adjacent the chart drive area of a polygraph indicating when the examiner and examinee have time to ask and respond to a test examination question before the next question.

4 Claims, 7 Drawing Figures

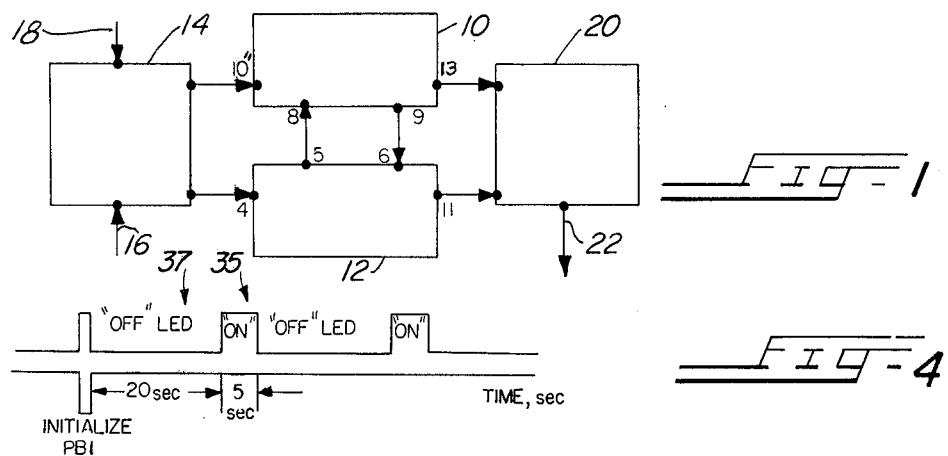
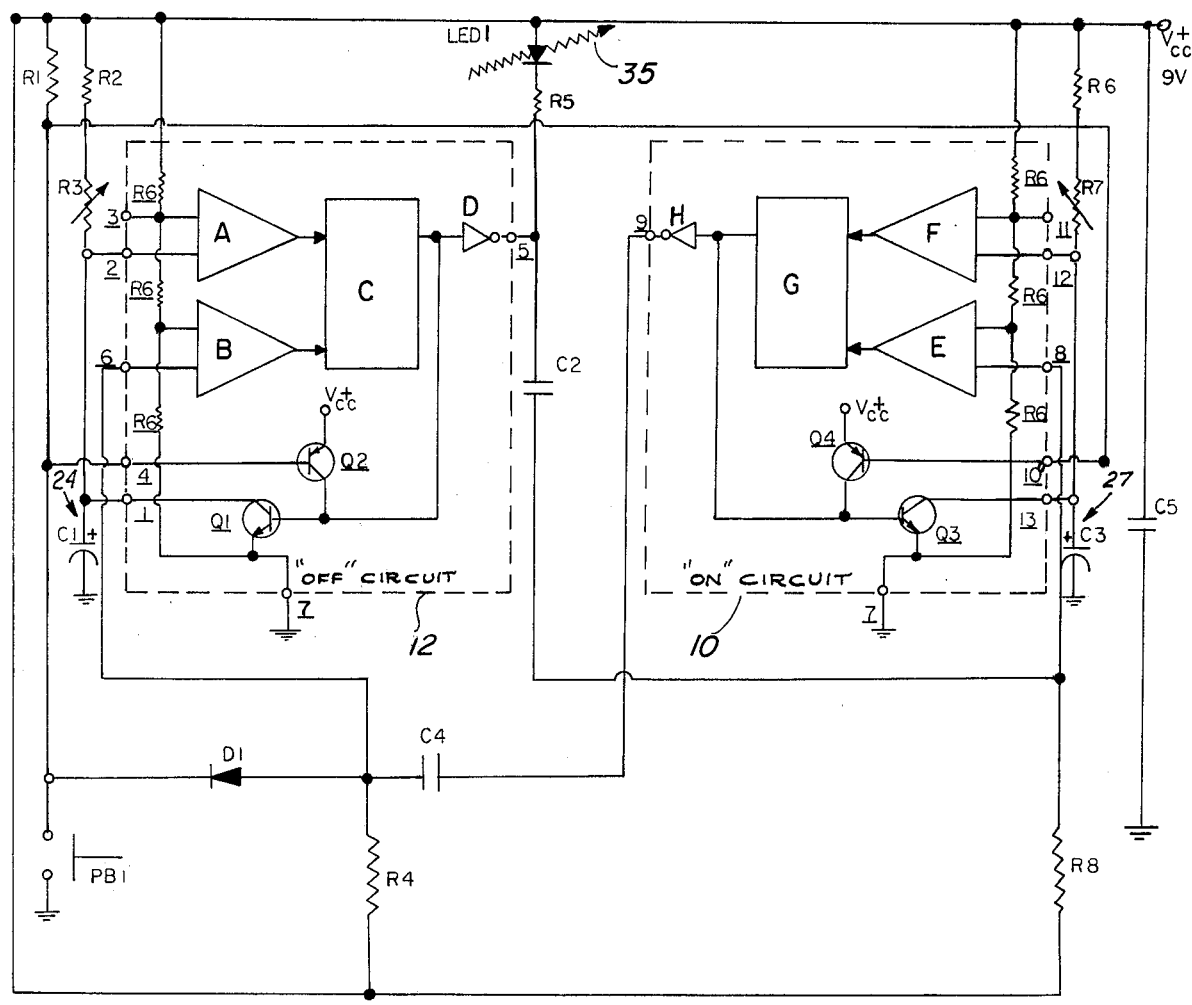
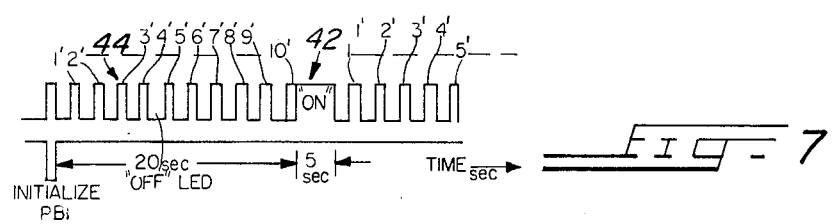

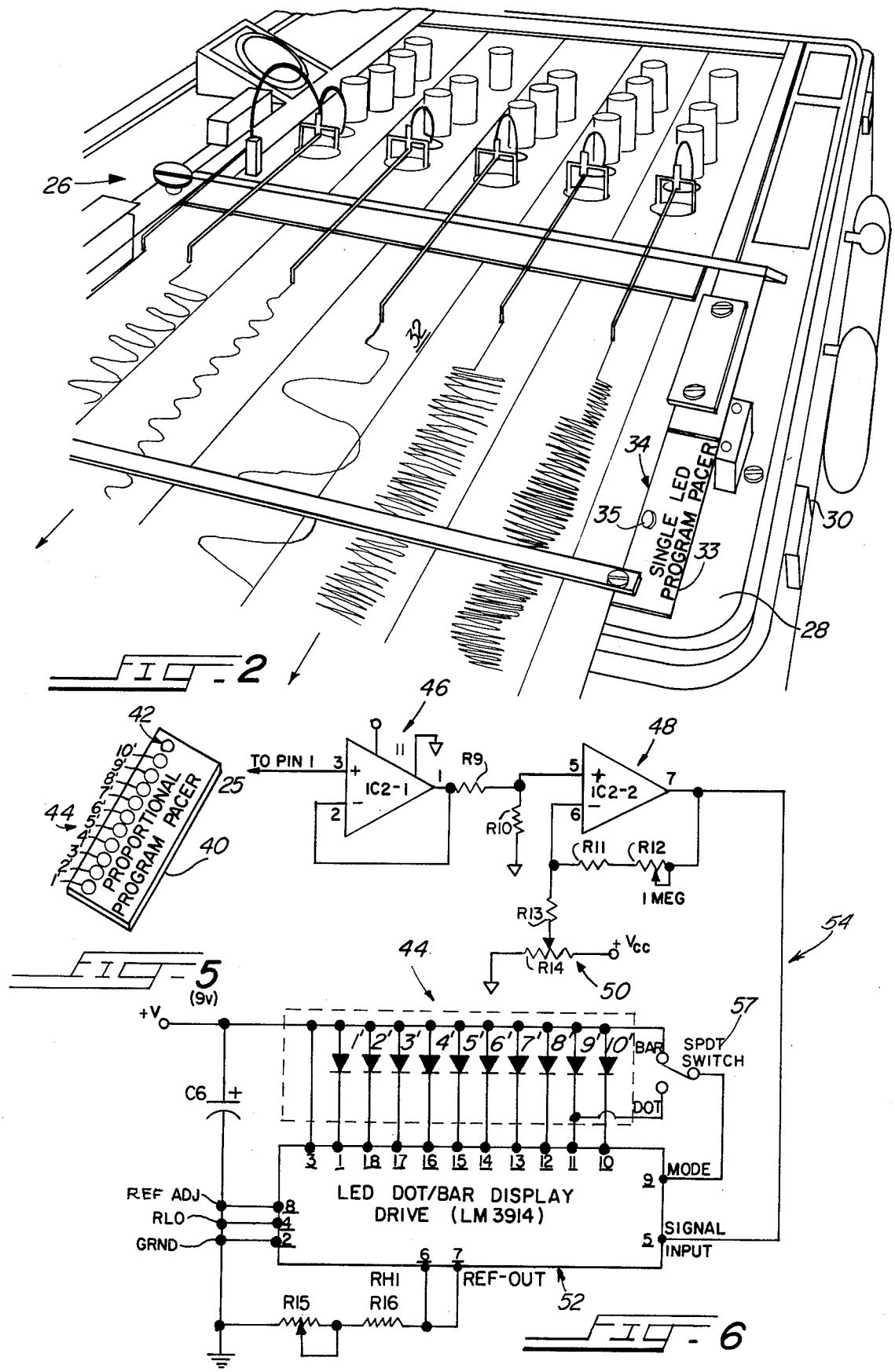

PROGRAM PACER

BACKGROUND OF THE INVENTION

For many years in the polygraph art, truth verification question pacing for insuring that the examinee has sufficient time to respond psychophysiologically to a test examination question before being asked the next question has been accomplished by "mark-matching". Mark-matching requires only that the operator mark lines with reference to a stationary indexing point located along the side of the chart scribing area before asking the next question. Mark-matching requires considerable effort since the examiner is usually simultaneously occupied with other things that demand his immediate attention, such as watching multiple channel chart tracings, adjusting pen positions, marking examiner adjustments on the chart, watching the subject, etc.

There is an established need in the polygraph art for a question pacing aid that visually, audibly or tactily cues the examiner when sufficient time has passed for the examinee to respond to a test examination question so that the next question can be asked at the most appropriate time psychophysiologically.

SUMMARY OF THE INVENTION

The gist of this invention lies in a pulsed lighting display for a polygraph instrument that visually informs the examiner that sufficient time has passed for the examinee to respond to a test examination question before he is asked another question. The lighting display mounts in a prominent position adjacent the chart drive area of the polygraph within the view of the examiner when testing. In one species of the program pacer, the lighting display comprises a single pulsed light emitting diode connected to a programmable "on-off" timing circuit which supplies electrical power to the diode. The timing circuit comprises two programmable timers, one an "On-LED" monostable timer and the other an "Off-LED" monostable timer. Both timers connect in cascade so that one triggers the other at the completion of its programmed time and vice versa to provide a steady stream of "on-off" output pulses. An output formating circuit takes the pulsed output from the timers and converts it to a visual readout for the examiner by means of a single light emitting diode.

Although special input formating circuits could be used to remotely control or externally program the monostables, a conventional pushbutton initializes, resets and starts the timing cycle. Programming the monostables is by varied resistance in an RC timing component associated with each.

Another species of program pacer uses a proportional display to provide significantly more informative visual readout to the examiner than the single LED. The proportional display program pacer comprises a single LED (green) followed by a row of ten LED's (amber). The single LED lights during the question asking period. The ten LED's light during the answer period either as a bar graph or a moving dot display to indicate the elapsed (or remaining) portion of the answer time available.

The bar graph display or the moving dot display are switch selectable. Since the timing adjustments must be readily accessible to the operator, the timing resistance and reset switch locate on the chart drive of the polygraph.

DESCRIPTION OF THE DRAWINGS

FIG. 1 shows a block diagram for the program pacer circuit;

FIG. 2 shows the single light emitting diode mounted adjacent the polygraph chart area for a single LED display;

FIG. 3 shows the circuit diagram comprising a Signetics NE 556 dual-unit general purpose timer incorporating two RC timing circuits for the single LED program pacer;

FIG. 4 shows the timing diagram for the single LED program pacer;

FIG. 5 shows the single green and ten amber light emitting diodes mounted adjacent the polygraph chart for proportional LED display;

FIG. 6 shows the circuit diagram comprising a National Semiconductor LM 3914 LED dot/bar display unit driving the ten LED display; and FIG. 7 shows the timing diagram for the proportional LED display program pacer.

THE PREFERRED EMBODIMENT

Referring to FIG. 1, the single LED "On-Off" display program pacer comprises an "On-LED" monostable timer 10 as one timing unit of a Signetics NE 556 dual-unit general purpose timer. An "Off-LED" monostable timing circuit 12 operationally connects to the "On-LED" monostable timing circuit 10 through output pin 5 on monostable timer 12 to trigger pin 8 on monostable timer 10. An input formating circuit 14 having initializing and remote programming input pins 16 and 18, respectively, operationally connects to monostable timing circuits 10 and 12 through reset pins 4 and 10", respectively. An output formating circuit 20, having readout pin 22, operationally connects to "On-LED" and "Off-LED" monostable timing circuits 10 and 12 through output pins 11 and 13, respectively. "On-LED" monostable 10 connects to "Off-LED" monostable 12 through output pin 9 on monostable 10 to trigger pin 6 on monostable 12.

Referring to FIG. 2, the single LED pacer comprises a chart drive area 26 which mounts on the paper storage compartment lid 28 on top of a carrying case 30. Chart paper 32 moves in the direction indicated by the arrow over the drive area 26. An LED display 34 having a single light emitting diode (green) 36, which when "On" indicates the running of the question asking interval and when "Off" indicates the running of the response interval, mounts on the lid 28 of case 30 adjacent the moving chart 32 within the primary visual field of the examiner when testing.

Referring to FIG. 3 showing the single LED timing circuit, an "Off-LED" RC timing component 24 (nominally 20 seconds) comprising a 100 uf capacitance C1 connects between ground and discharge and threshold pins 1 and 2, respectively, on "Off-LED" monostable timing circuit (dotted line) 12 and a fixed 56K resistance R2 and a variable 100K resistance R3 connected in series between pins 1 and 2 and a 9 volt D.C. source + Vcc. A pushbutton switch (normally open) PB1 connects to reset pins 4 and 10", respectively, on "Off-LED" monostable timing circuit 12 and "On-LED" monostable timing circuit 10, respectively, and a fixed 27K "pull-up" resistor R1 to 9 volt D.C. source + Vcc. Pushbutton switch PB1 also connects to trigger pin 6 of the "Off-LED" monostable timing circuit 12 through the 1N914 steering diode D1. A 0.001 uf capacitor C4 connects output pin 9 of "On-LED" monostable timing circuit 10 to trigger pin 6 of "Off-LED" monostable timing circuit 12 and a 27K fixed "pull-up" resistor R4 to 9 volt D.C. source+Vcc. Output pin 5 of "Off-LED" circuit 12 connects to a fixed 560 ohm resistance R5 and a green light emitting diode LED 1 connected in series between pin 5 and a 9 volt D.C. source+Vcc, and pin 8 on "On-LED" circuit 10 through a 0.001 uf capacitor C2 and to a 27K fixed "pull-up" resistor R8 connected between pin 8 "On-LED" circuit 10 and a 9 volt D.C. source+Vcc. "On-LED" RC timing component 27 (nominally 5 seconds) comprising a 10 uf capacitor C3 connects between ground and discharge and threshold pins 13 and 12, respectively, on "On-LED" monostable timer 10 and a fixed 220K resistance R6 and a variable 100K resistance R7 connect in series between discharge and threshold pins 13 and 12 and the 9 volt D.C. source+Vcc. A 0.1 uf shunt capacitor C5 connects between ground and the 9 volt D.C. source+Vcc. A ground connects to ground pin 7 of the integrated circuit (Signetics NE556) which contains monostable 10 and 12.

When the 9 volt D.C. source+Vcc is first applied to the single LED display interrogation pacer, either or both RC timing components 24 and 27, comprising resistances R2 and R3 and capacitance C1 and R6 and R7 and capacitance C3 and its associate monostable timer 10 or 12 may be activated. After one cycle, one or the other of RC timing components 24 or 27 will assume control and correct "On-LED" and "Off-LED" time intervals will follow "Off-LED" or "On-LED" time intervals, as programmed.

Pushing the initializing button PB1 resets both "On-LED" and "Off-LED" monostable timers 10 and 12 and lights the LED. It also triggers the "Off-LED" monostable 12. Releasing the initializing button PB1 enables the "Off-LED" monostable 12 to turn off the LED for the programmed timing period (nominally 20 seconds). At the end of the "Off-LED" timing interval, the "Off-LED" monostable 12 triggers the preprogrammed "On-LED" monostable 10.

Both "On-LED" and "Off-LED" monostables 10 and 12 discharge the timing capacitor C1 or C3 when pushbutton PB1 is initialized. A negative going pulse to comparator B or E in monostable timers 10 or 12 causes flip-flop C or G in the same to turn off the discharge transistor Q1 or Q3 and allow capacitor C1 or C3 to charge via resistors R2, R3 or R6, R7, respectively. When the voltage on C1 or C3 reaches the proper level, comparator A or F causes flip-flop C or G to flip causing the discharge transistor Q1 or Q3 to discharge C1 or C3, respectively. The "On-LED" monostable 10 or the "Off-LED" monostable 12 will then wait for the application of a trigger pulse to its trigger pin 8 or 6, respectively. The recycling is implemented by coupling these trigger pulses through capacitors C2 and C4 from output pins 5 and 9 on "Off-LED" and "On-LED" monostables 10 and 12, respectively. Thus, while either "On-LED" or "Off-LED" monostable 10 or 12 is timing, the other monostable 12 or 10 is waiting for its trigger pulse, and vice versa.

Referring to FIG. 4, the timing diagram for the single LED display program pacer shows the programmable "On-LED" 3-8 second time interval for the examiner's question and the programmable "Off-LED" 10-30 second interval for the examiner's response and indicates its recycling nature after initiation by pushbutton PB1. Programming is accomplished by adjustable resistors R3 and R7.

Referring to FIG. 5, the proportional display interrogation pacer comprises an LED display 40 having a single LED (green) 42 for indicating to the examiner the available question asking time interval which mounts on lid 28 of polygraph carrying case 30 adjacent to the moving chart 32 on chart drive area 26 within the primary visual field of the examiner when testing. A proportional display of ten LED's (amber) 44 mounts on display 40 adjacent to and in line with the single LED 42 for indicating to the examiner during the answer interval the elapsed (or remaining) portion of the answer period available. A bar graph or moving dot proportional display 44 option is provided by the National Semiconductor LED dot/bar display driver (LM 3914).

Referring again to FIG. 3 and to FIG. 6, the same basic LED display timing circuit also is used in the LED proportional display timing circuit 54.

Referring to FIG. 3 showing the single LED timing circuit, an "Off-LED" RC timing component 24 (nominally 20 seconds) comprising a 100 uf capacitance C1 connects between ground and discharge and threshold pins 1 and 2, respectively, on "Off-LED" monostable timing circuit (dotted line) 12 and a fixed 56K resistance R2 and a variable 100K resistance R3 connected in series between pins 1 and 2 and a 9 volt D.C. source+Vcc. A pushbutton switch (normally open) PB1 connects to reset pins 4 and 10", respectively, on "Off-LED" monostable timing circuit 12 and "On-LED" monostable timing circuit 10, respectively, and a fixed 27K "pull-up" resistor R1 to 9 volt D.C. source+Vcc. Pushbutton switch PB1 also connects to trigger pin 6 of the "Off-LED" monostable timing circuit 12 through the 1N914 steering diode D1. A 0.001 uf capacitor C4 connects output pin 9 of "On-LED" monostable timing circuit 10 to trigger pin 6 of "Off-LED" monostable timing circuit 12 and a 27K fixed "pull-up" resistor R4 to 9 volt D.C. source+Vcc. Output pin 5 of "Off-LED" circuit 12 connects to a fixed 560 ohm resistance R5 and a green light emitting diode LED 1 connected in series between pin 5 and a 9 volt D.C. source+Vcc, and pin 8 on "On-LED" circuit 10 through a 0.001 uf capacitor C2 and to a 27K fixed "pull-up" resistor R8 connected between pin 8 "On-LED" circuit 10 and a 9 volt D.C. source+Vcc. "On-LED" RC timing component 27 (nominally 5 seconds) comprising a 10 uf capacitor C3 connects between ground and discharge and threshold pins 13 and 12, respectively, on "On-LED" monostable timer 10 and a fixed 220K resistance R6 and a variable 100K resistance R7 connect in series between discharge and threshold pins 13 and 12 and the 9 volt D.C. source+Vcc. A 0.1 uf shunt capacitor C5 connects between ground and the 9 volt D.C. source+Vcc. A ground connects to ground pin 7 of the integrated circuit (Signetics NE556) which contains monostable 10 and 12.

In addition to the basic single LED display timing circuit 11, the proportional LED display timing circuit 54 includes a unity gain buffer 46 comprising a National Semiconductor LM 324 integrated circuit IC2-1 having output pin 1 and negative input pin 2 connected in unattenuated feedback relation, as shown in FIG. 6, and signal input pin 3 connected to pin 1, as shown in FIG. 3. A 47K resistor R9 connects at one end to the output pin 1 of integrated circuit IC 2-1 and its other end to ground through another 47K resistor R10. A gain and offset adjust amplifier 48 comprises another section of the National Semiconductor LM 324 integrated circuit IC2-2 having output pin 7 and negative input pin 6 connected in attenuated feedback relation, as shown in FIG. 6, through a fixed 100K resistor R11 and an adjustable 1 meg. resistor R12 with input pin 6 connecting through a 100K resistor R13 to potentiometer 50 having an adjustable 10K resistor R14 which is connected between the 9 volt D.C. source+Vcc and ground. Signal input pin 5 of integrated circuit IC2-2 connects to the resistor divider R9-R10.

An LED proportional dot/bar display driver 52 comprises a National Semiconductor LM 3914 having a signal input at pin 5 which connects to the output pin 7 of integrated circuit IC2-2; a power supply pin 3 which connects to the 9 volt D.C. source+Vcc; a Ref. Adj. pin 8, an RLO pin 4, and a ground pin 2 which connect directly to ground; and RH1 and Ref. Out pins 6 and 7, respectively, which connect to ground through a 560 u resistor R15 and an adjustable 5K resistor R16; and LED driver pins 1, 18, 17, 16, 15, 14, 13, 12, 11 and 10 plus a mode pin 9. A 10 uf bypass capacitor C6 shunts across the LED proportional display 44 and the proportional display driver 52 from 9 volt D.C. source+Vcc to ground.

LED proportional display 44 comprises ten LED's (amber) 1', 2', 3', 4', 5', 6', 7', 8', 9' and 10' connecting between 9 volt D.C. source+Vcc and LED driver pins 1, 18, 17, 16, 15, 14, 13, 12, 11 and 10 on LED portional display driver 52. A SPDT switch 57 connects mode pin 9 to either a 9 volt D.C. source+Vcc or to LED driver pin 11.

Referring to FIG. 7, the timing diagram for the proportional LED display interrogation pacer shows the same programmable "On-LED" 3-8 second time interval for the examiner's question and the programmable "Off-LED" 10-30 second interval for the examinee's response.

In the bar graph LED proportional display 44, the number of amber LED's lit depends on the elapsed time of the answer period. If 10% of the time period elapsed, only amber LED 1' is lit. If 20% of the time period has elapsed, both LED 1' and 2' are lit ... and so on until LED 1'-10' are lit indicating that the answer peiod is completed. Then the ten amber LED's 1'-10' turn off and the single green LED 42 lights indicating the start of the question asking period.

In the moving dot LED proportional display 44, only one amber LED 1'-10' lights at a time. Amber LED 1' lights after 10% of the time period of the answer has elapsed. LED 2' lights when 20% of the time period has elapsed ... and so on until LED 10' lights indicating that the time period ends. Then the amber LED 10' turns off and the single green LED 42 lights indicating the start of the question asking period. A SPDT switch 57 selects the bar display or the moving dot display according to the examiner.

Although but two specific embodiments of this invention are herein shown and described, it will be understood that details of the construction shown may be altered or omitted without departing from the spirit of the invention as defined by the following claims.

I claim:

1. Polygraphic apparatus including a chart area and a graphic output device for producing a record representative of the pulse of the subject; said apparatus including a timed lighting display means adjacent to the chart area for indicating when the examiner and examinee have time to ask and respond to a test examination question before the next question.

2. Polygraphic apparatus according to claim 1 wherein the timed lighting display means comprises:
   (a) a source of D.C. power;
   (b) an input formating circuit operationally connected to the source of D.C. power having initializing and remote programming inputs;
   (c) a timing circuit operationally connected to the input formating circuit for timing the "on" signal,
   (d) a timing circuit operationally connected to the input formating circuit and to the "on" timing circuit for timing the "off" signal; and
   (e) an output formating circuit operationally connected to the "on" timing circuit and the "off" timing circuit having a readout means.

3. Polygraphic apparatus according to claim 2 wherein the readout means comprises a single "on-off" light for indicating the running of a question interval and the running of the response interval.

4. Polygraphic apparatus according to claim 2 wherein the readout means comprises a single light for indicating the running of the question interval and a proportional display of a plurality of lights for indicating the running of the answer interval.

* * * * *